(12) United States Patent
Turner

(10) Patent No.: US 6,708,071 B1
(45) Date of Patent: Mar. 16, 2004

(54) METHOD AND SYSTEM FOR DEFINING AND VERIFYING A PART

(75) Inventor: Greg Allen Turner, Arlington, TX (US)

(73) Assignee: Vought Aircraft Industries, Inc., Dallas, TX (US)

( * ) Notice: Subject to any disclaimer, the term of this patent is extended or adjusted under 35 U.S.C. 154(b) by 651 days.

(21) Appl. No.: 09/639,425

(22) Filed: Aug. 15, 2000

(51) Int. Cl.[7] .............................................. G06F 19/00
(52) U.S. Cl. ........................... 700/98; 700/97; 700/118; 700/163; 700/195; 382/154; 345/419; 345/420
(58) Field of Search .............................. 700/97, 98, 118, 700/162, 195; 382/154; 345/419, 420, 418

(56) References Cited

U.S. PATENT DOCUMENTS

| | | | |
|---|---|---|---|
| 4,641,270 A | 2/1987 | Lalloz et al. | 364/476 |
| 4,649,498 A | 3/1987 | Kedem et al. | 364/518 |
| 4,754,417 A | 6/1988 | Beeson et al. | 364/560 |
| 5,014,207 A | 5/1991 | Lawton | 364/468 |
| 5,089,184 A | 2/1992 | Hirano et al. | 264/22 |
| 5,094,935 A | 3/1992 | Vassiliou et al. | 430/320 |
| 5,096,530 A | 3/1992 | Cohen | 156/229 |
| 5,133,987 A | 7/1992 | Spence et al. | 427/53.1 |
| 5,175,077 A | 12/1992 | Grossa | 430/327 |
| 5,198,159 A | 3/1993 | Nakamura et al. | 264/22 |
| 5,351,196 A | 9/1994 | Sowar et al. | 364/474.24 |
| 5,452,219 A | 9/1995 | Dehoff et al. | 364/474.05 |
| 5,460,758 A | 10/1995 | Langer et al. | 264/401 |
| 5,501,824 A | 3/1996 | Almquist et al. | 264/401 |
| 5,546,313 A | 8/1996 | Masters | 364/468.03 |
| 5,552,992 A | 9/1996 | Hunter | 364/468.25 |
| 5,630,981 A | 5/1997 | Hull | 264/401 |
| 5,711,911 A | 1/1998 | Hull | 264/401 |
| 5,717,599 A | 2/1998 | Menhennett et al. | 364/468.25 |
| 6,267,674 B1 * | 7/2001 | Kondo et al. | 463/32 |
| 6,351,721 B1 * | 2/2002 | Werner et al. | 702/166 |
| 2001/0029202 A1 * | 10/2001 | Kondo et al. | 463/31 |

FOREIGN PATENT DOCUMENTS

EP    0 574 098 A1    12/1993    ............. A61F/2/30

OTHER PUBLICATIONS

WO 02/14966 A2, Feb. 21, 2002, Turner, Method and System for Defining and Verifying a Part.*
W. Duan, J. Zhou and K. Lai, "FSMT: a feature solid–modeling tool for feature–based design and manufacture," *Computer–Aided Design*, vol. 25, No. 1, XP 000330561, Jan. 1993, 10 pages.
George Allen, "Tolerances and Assemblies In CAD/CAM Systems," *Manufacturing Review*, vol., No. 4, XP 000423693, Dec. 1993, 9 pages.
PCT International Search Report in International Application No. PCT/US 01/25432, dated Sep. 6, 2002, 7 pages.

* cited by examiner

*Primary Examiner*—Ramesh Patel
(74) *Attorney, Agent, or Firm*—Baker Botts L.L.P.

(57) ABSTRACT

A system for verifying a part disclosed. The system comprises a virtual part and a virtual gage associated with the virtual part. A physical part corresponds to the virtual part. A digitized part is generated from the physical part, and the virtual gage evaluates the digitized part. A method for verifying a part is disclosed. A virtual part is provided. A virtual gage associated with the virtual part is generated. A physical part corresponding to the virtual part is produced. A digitized part is generated from the physical part. The digitized part is evaluated with the virtual gage.

32 Claims, 3 Drawing Sheets

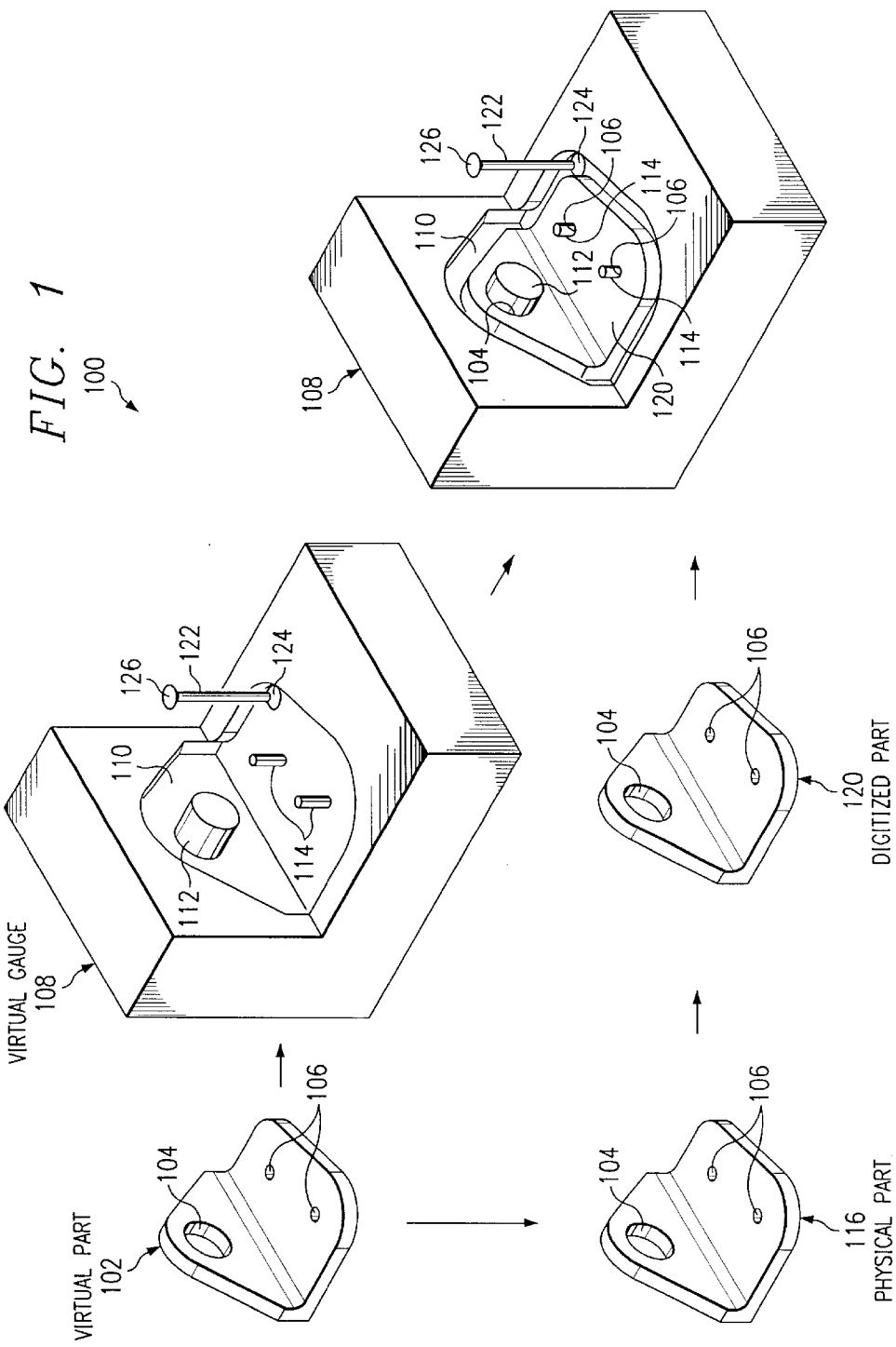

METHOD AND SYSTEM FOR DEFINING AND VERIFYING A PART

TECHNICAL FIELD OF THE INVENTION

This invention relates generally to the field of manufacturing and more specifically to a method and system for defining and verifying a part.

BACKGROUND OF THE INVENTION

The increased distribution of part manufacturing across different manufacturing sites has led to the demand for improved methods and systems for part definition and verification. Part definition describes the design specifications of a part to be manufactured. Part verification evaluates whether a manufactured part satisfies the design specifications.

Known methods of part definition and verification, however, have not been satisfactory with respect to accuracy. According to one type of known method, design specifications are translated into written dimensions, and then a part is manufactured according to the dimensions. A gage used to verify the manufactured part is also produced from the dimensions. The manufactured part is aligned in the gage in order to verify whether the manufactured part satisfies the design specifications.

A problem with these known methods is that translating the part design to written dimensions may lead to ambiguity or error. Often, written dimensions do not clearly refer to a particular feature of a part, leading to misinterpretation of the dimensions when producing the part. Also, errors resulting from mistranscription of the dimensions may occur during the translation process. Similarly, ambiguity and error may occur when producing the gage from the dimensions, yielding an inaccurate gage. Another problem with these known methods is that they rely on written text, which often must be translated into a different language when sent to a different country. Translation of the text may also lead to ambiguity and error.

While these approaches have provided improvements over prior approaches, the challenges in the field of manufacturing have continued to increase with demands for more and better techniques having greater accuracy. Therefore, a need has arisen for a new method and system for defining and verifying a part.

SUMMARY OF THE INVENTION

In accordance with the present invention, a method and system for defining and verifying a part are provided that substantially eliminate or reduce the disadvantages and problems associated with previously developed systems and methods.

According to one embodiment of the present invention, a system for verifying a part disclosed. The system comprises a virtual part and a virtual gage associated with the virtual part. A physical part corresponds to the virtual part. A digitized part is generated from the physical part, and the virtual gage evaluates the digitized part.

According to one embodiment of the present is invention, a method for verifying a part is disclosed. A virtual part is provided. A virtual gage associated with the virtual part is generated. A physical part corresponding to the virtual part is produced. A digitized part is generated from the physical part. The digitized part is evaluated using the virtual gage to verify the physical part.

According to one embodiment of the present invention, a system for defining a part is disclosed. The system comprises a virtual part and a virtual gage associated with the virtual part. The virtual part and the virtual gage define a size and a shape of a physical part.

According to one embodiment of the present invention, a method for defining a part is disclosed. A virtual part is provided. A virtual gage associated with the virtual part is generated. The virtual part and the virtual gage define a shape and a size of a physical part.

Embodiments of the present invention may provide technical advantages. A technical advantage of one embodiment of the present invention is that it provides an image representation of a part that may provide more accurate part definition and verification. The image representation eliminates the need to translate design specifications to written dimensions, reducing the ambiguity and error that may occur during part definition and verification. Another technical advantage of one embodiment is that the virtual part and the virtual gage provide accurate and easily transmittable design specifications. The virtual part and the virtual gage comprise images, not text, and do not need to be translated to a different language, reducing the ambiguity and error associated with translation.

Other technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which:

FIG. 1 illustrates one embodiment of a system for defining and verifying a part that may be used in accordance with the present invention;

DETAILED DESCRIPTION OF THE DRAWINGS

Figure 2A:
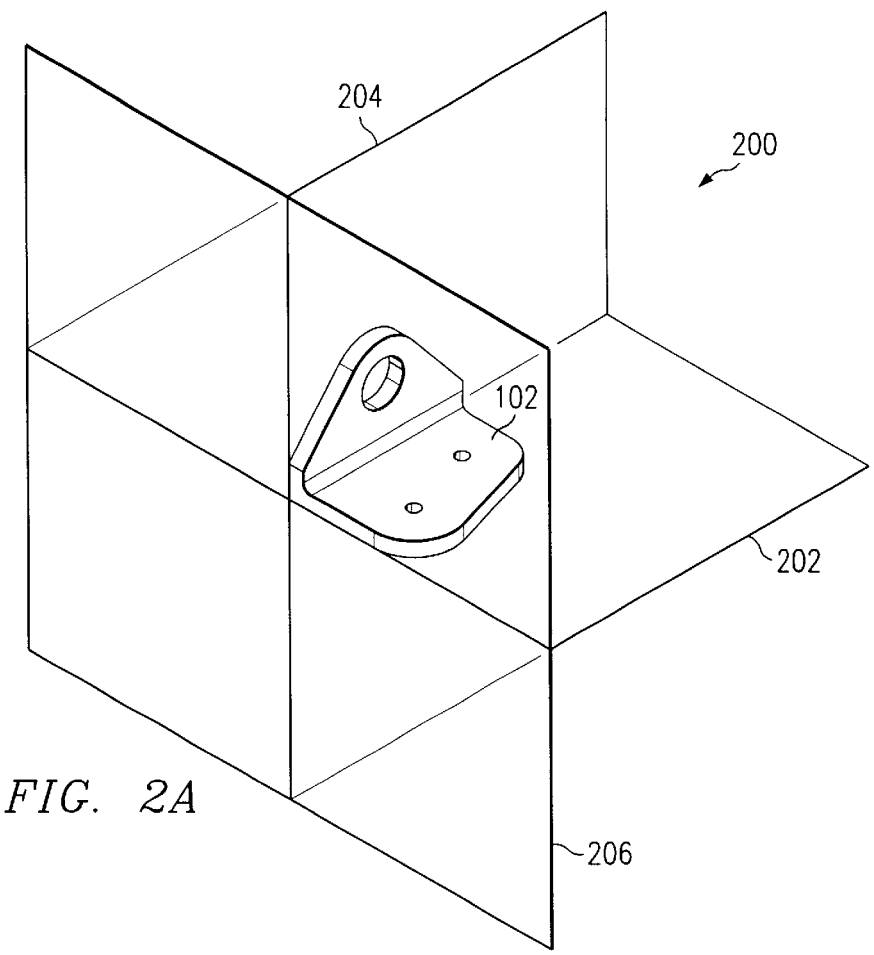
FIG. 2A illustrates one embodiment of a datum plane system that may be used in accordance with the present invention.
Figure 2B:
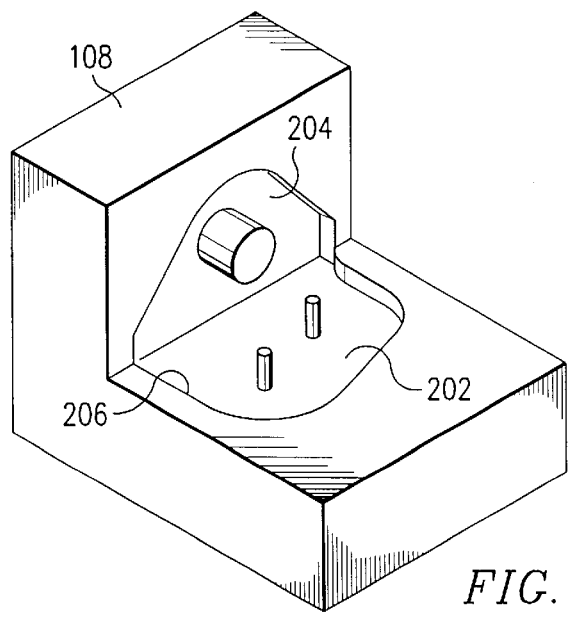
FIG. 2B illustrates one embodiment of a virtual gage that may be used in accordance with the present invention.
Figure 3:
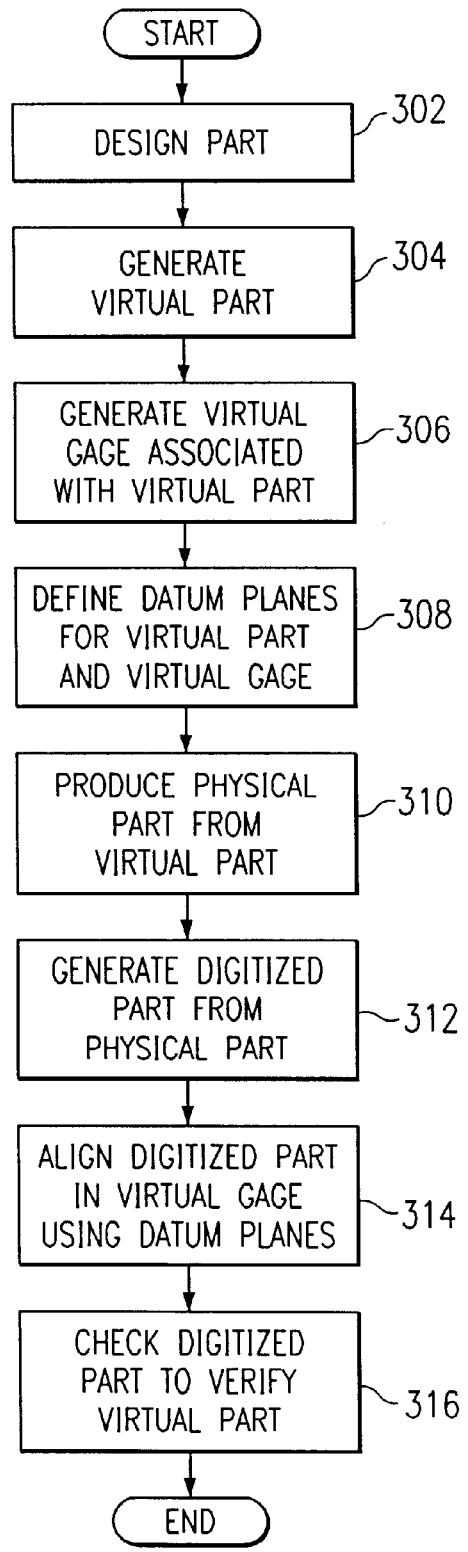
FIG. 3 is a flowchart illustrating one embodiment of a method for defining and verifying a part in accordance with the present invention.

An embodiment of the present invention and its advantages are best understood by referring to FIGS. 1–3 of the drawings, like numerals being used for like and corresponding parts of the various drawings.

FIG. 1 illustrates one embodiment of a system 100 for defining and verifying a part that many be used in accordance with the present invention. According to one embodiment, system 100 includes a virtual part 102 and a virtual gage 108 associated with virtual part 102. A physical part 116 corresponds to virtual part 102 and is verified using virtual gage 108.

In one embodiment, virtual part 102 includes a large hole 104 and two small holes 106. Virtual part 102 may comprise, for example, a design for a part manufactured for use in an automobile, an airplane, or other product, or may comprise a product in itself. Virtual part 102 may define an attribute, for example, the width of large hole 104, as a feature that may be measured by statistical process control data collection or by key characteristic data collection.

Virtual part 102 may be generated during the design process by the designer of the part, for example, an engineer, and may be generated using any suitable solid modeling software program, for example, CATIA or Unigraphics. During the design process, several requirements, for example, form, fit, and function requirements, may be taken into account. Form, fit, and function requirements may include the function of the part, the shape of surrounding parts, the composition of the part, and the expected durability of the part. Generating virtual part 102 during the design process may reduce the potential for error that may occur during the known processes of translating the design to written dimensions and forming a model from the written dimensions.

Virtual gage 108 includes a shaped depression 110, a large pin 112, and two small pins 114. Virtual gage 108 is associated with virtual part 102, and may be used to define the shape and size requirements for manufacturing and inspecting a part. Tolerance limits associated with virtual part 102 may be used to define, for example, the maximum and minimum limitations for the size and shape of virtual part 102 and the size, shape, and location of attributes of the virtual part 102. Virtual gage 108 may be used to define the tolerance limits for virtual part 102. Shaped depression 110 defines tolerance limits for the height, length, and width of virtual part 102, large pin 112 defines tolerance limits for the size and location of large hole 104, and small pins 114 define tolerance limits for the size and locations of small holes 106.

In one embodiment, a go-no go gage 122 may be used to define the acceptable maximum and minimum boundaries of virtual part 102. A go end 124 of go-no go gage 122 may be used to define the maximum boundaries of virtual part 102. Go end 124 is designed to fit in the space between the largest acceptable virtual part 102 and shaped depression 110. A part for which go end 124 does not fit within the space exceeds the maximum boundaries of virtual part 102. A no go end 126 may be used to define the minimum boundaries of virtual part 102. No go end 126 is designed to not fit in the space between the smallest acceptable virtual part 102 and shaped depression 110. A part for which no go end 126 fits in the space exceeds the minimum boundaries of virtual part 102. Software applications may allow kinematic simulation of the go-no go inspection.

Virtual gage 108 may be generated concurrently with virtual part 102 using a suitable solid modeling software program. For example, a solid modeling software program may display the designed part and parts surrounding and fitting with the designed part. A part designer may design virtual gage 108 as a surrounding part that fits around virtual part 102. Generating virtual gage 108 using virtual part 102 may reduce the potential for error resulting from the known process of translating a design to written dimensions and forming a gage from the written dimensions.

Virtual part 102 and virtual gage 108 may be easily communicated to manufacturers to define the shape and size requirements for manufacturing and inspecting a part. Manufacturers may, for example, use virtual gage 108 to verify a digitized image of a manufactured part, or may produce a physical gage to physically verify a physical part.

Physical part 116 corresponds to and may be produced using virtual part 102. To verify the size and shape of physical part 116, a digitized part 112 is generated from physical part 116 and is compared with virtual gage 108. Digitized part 120 is an electronic image of physical part 116, and may be generated using laser photogrametry, laser scanning, stereolithography, or any other suitable method of producing an electronic image from a physical object. Digitized part 120 is aligned in shaped depression 110 of virtual gage 108 to verify the dimensions of physical part 116. Large pin 112 verifies large hole 104, and small pins 114 verify small holes 106. A go-no go gage 122 may be used to verify whether the boundaries of physical part 116 are acceptable.

FIG. 2A illustrates one embodiment of a datum plane system 200 that may be used in accordance with the present invention. To verify physical part 116, digitized part 120 representing physical part 116 is placed in virtual gage 108 to evaluate the size and shape of digitized part 120 and verify physical part 116. To evaluate digitized part 120, digitized part 120 must be properly aligned within virtual gage 108. Datum planes are defined for virtual part 102 to show the proper alignment, and then are used to align digitized part 120 in virtual gage 108.

Referring to FIG. 2A, a datum plane system 200 of datum planes, or planes, is defined for virtual part 102. First, plane A 202 is defined as a plane corresponding to three selected points of contact on the bottom side of virtual part 102. Next, plane B 204 is defined as the plane orthogonal to plane A 202 and corresponding to two selected points of contact on the back side of virtual part 102. Finally, plane C 206 is defined as the plane orthogonal to planes A 202 and B 204 and corresponding to one point of contact on a side of virtual part 102. Datum plane system 200 defines the proper alignment of virtual part 102. Defining planes in a different order, for example, first a plane on the side of virtual part 102, next a plane on the back, and last a plane on the bottom, results in a different alignment of virtual part 202. To align a virtual part 102 in virtual gage 108, planes 202, 204, and 206 are also defined for virtual gage 108, as described in connection with FIG. 2B. By using the alignment defined by datum plane system 200, digitized part 120 may be similarly aligned in virtual gage 108.

FIG. 2B illustrates one embodiment of a virtual gage 108 that may be used in accordance with the present invention. To align virtual part 102 in virtual gage 108, datum planes, or planes, 202, 204, and 206 are defined for virtual gage 108. First, plane A 202 is defined as the plane of the virtual gage 108 corresponding to the three selected points on the bottom of virtual part 102. Next, plane B 204 is defined as the plane of virtual gage 108 orthogonal to plane A 202 and corresponding to the two selected points on the back of virtual part 102. Finally, plane C 206 is defined as the plane of virtual gage 108 orthogonal to planes A 202 and B 204 and corresponding to the selected point on the side of virtual part 102.

To evaluate the size and shape of digitized part 120, digitized part 120 must be properly aligned in virtual gage 108 using, for example, the alignment defined by datum plane system 200. First, three points on the bottom side of digitized part 120 corresponding to the three selected points on the bottom side virtual part 102 are placed on plane A 202. Next, two points on the back side of digitized part 120 corresponding to the two selected points on the back of virtual part 102 are placed on plane B 204. Finally, a point on the side of digitized part 120 corresponding to the selected point on the side of virtual part 102 is placed on plane C 202. After digitized part 120 has been properly aligned in virtual gage 108, digitized part 120 may be evaluated to verify physical part 116.

FIG. 3 is a flowchart illustrating one embodiment of a method for defining and verifying a part in accordance with the present invention. The method begins at step 302, where a part is designed. The part may be designed in response to specific shape and size requirements and may have specific acceptable shapes and sizes. At step 304, virtual part 102 of the designed part is generated. Tolerance limits may be associated with virtual part 102 to define acceptable shapes and sizes for virtual part 102. Virtual part 102 may be generated during the design process using, for example, a solid modeling software program.

At step 306, virtual gage 108 associated with virtual part 102 is generated. Virtual gage 108 may be generated using virtual part 102 and the tolerance limits for virtual part 102, and may be generated concurrently with virtual part 102. For example, a solid modeling software program may display the designed part and parts surrounding and fitting with the designed part. A part designer may design virtual gage 108 as a surrounding part that fits around virtual part 102.

At step 308, datum planes, or planes, are defined for virtual part 102 and virtual gage 108 to define the proper alignment of a part in virtual gage 108. First, plane A 202 is defined as a plane corresponding to three selected points of contact on the bottom of virtual part 102. Next, plane B 204 is defined as the plane orthogonal plane A 202 and corresponding to two selected points of contact on the back side of virtual part 102. Finally, plane C 206 is defined as the plane orthogonal to planes A 202 and B 204 and corresponding to one point of contact on a side of virtual part 102.

To define datum planes, or planes, 202, 204, and 206 for virtual gage 108, first, plane A 202 is defined as the plane of the virtual gage 108 corresponding to the three selected points on the bottom of virtual part 102. Next, plane B 204 is defined as the plane of virtual gage 108 orthogonal to plane A 202 and corresponding to the two selected points on the back of virtual part 102. Finally, plane C 206 is defined as the plane of virtual gage 108 orthogonal to planes A 202 and B 204 and corresponding to the selected point on the side of virtual part 102.

At step 310, physical part 116 corresponding to virtual part 102 is produced, and may be produced using virtual part 102. At step 312, digitized part 120 is generated from physical part 116 to verify physical part 116. Digitized part may be generated by, for example, laser photogrametry, laser scanning, or other suitable method for generating an electronic image from a physical object. At step 314, digitized part 120 is aligned in virtual gage 108 using datum planes 202, 204, and 206. First, three points on the bottom side of digitized part 120 corresponding to the three selected points on the bottom side of virtual part 102 are placed on plane A 202. Next, two points on the back side of digitized part 120 corresponding to the two selected points on the back of virtual part 102 are placed on plane B 204. Finally, a point on the side of digitized part 120 corresponding to the selected point on the side of virtual part 102 is placed on plane C 202.

At step 312, digitized part 120 is evaluated using virtual gage 108 to verify physical part 116. Shaped depression 110 may be used to evaluate the dimensions of digitized part 120. Large pin 112 may be used to evaluate large hole 104, and small pins 114 may be used to evaluate small holes 106. Go-no go gage 122 may be used to evaluate whether digitized part 120 satisfies the maximum and minimum limits of virtual part 102. By evaluating digitized part 120, physical part 116 may be quickly verified to satisfy the form, fit, and function requirements of virtual part 102. Results of the part verification may be easily stored or communicated to a product customer or a quality control organization. After verifying physical part 116, the method terminates.

Embodiments of the present invention may provide technical advantages. A technical advantage of one embodiment of the present invention is that it provides an image representation of a part that may yield more accurate part definition and verification. The image representation eliminates the need to translate design specifications to written dimensions, reducing ambiguity and error occurring during part definition and verification. Another technical advantage of one embodiment is that the virtual part and the virtual gage provide accurate and easily transmittable design specifications. The virtual part and the virtual gage comprise shapes, not text, and do not need to be translated to a different language, reducing the ambiguity and error associated with translation.

Although an embodiment of the invention and its advantages are described in detail, a person skilled in the art could make various alternations, additions, and omissions without departing from the spirit and scope of the present invention as defined by the appended claims.

What is claimed is:

1. Software for verifying a part, the software embodied in a medium and operable to:
   generate a virtual part operable to describe a part;
   generate a virtual gage operable to define the virtual part;
   generate a digitized part from a physical part corresponding to the virtual part; and
   compare the digitized part with the virtual gage to evaluate the digitized part.

2. The software of claim 1, wherein the virtual part is generated during a design process.

3. The software of claim 1, wherein the virtual gage is generated generally concurrently with the virtual part.

4. The software of claim 1, wherein the virtual part is associated with a tolerance limit.

5. The software of claim 4, wherein the virtual gage is generated from the virtual part and the tolerance limit.

6. The software of claim 4, wherein the virtual gage is operable to define the tolerance limit of the virtual part.

7. The software of claim 4, further comprising a go-no go gage, the go-no go gage operable to define the tolerance limit of the virtual part.

8. The software of claim 1, further comprising a datum plane system, the datum plane system operable to align the digitized part in the virtual gage.

9. A method for verifying a part, the method comprising:
   generating a virtual part operable to describe a part;
   generating a virtual gage operable to define the virtual part;
   generating a digitized part from a physical part corresponding to the virtual part; and
   comparing the digitized part with the virtual gage to evaluate the digitized part with the virtual gage.

10. The method of claim 9, further comprising generating the virtual part during a design process.

11. The method of claim 9, further comprising generating the virtual gage generally concurrently with the virtual part.

12. The method of claim 9, further comprising associating a tolerance limit with the virtual part.

13. The method of claim 12, further comprising generating the virtual gage from the virtual part and the tolerance limit.

14. The method of claim 12, further comprising defining the tolerance limit of the virtual part using the virtual gage.

15. The method of claim 12, further comprising providing a go-no go gage, the go-no go gage operable to define the tolerance limit of the virtual part.

16. The method of claim 9, further comprising providing a datum plane system, the datum plane system operable to align the digitized part in the virtual gage.

17. Software for defining a part, the software embodied in a medium and operable to:
generate a virtual part operable to describe a part; and
generate a virtual gage operable to define the virtual part, wherein the virtual part and the virtual gage are operable to define a size and a shape of a physical part.

18. The software of claim 17, wherein the virtual part is generated during a design process.

19. The software of claim 17, wherein the virtual gage is generated generally concurrently with the virtual part.

20. The software of claim 17, wherein the virtual part is associated with a tolerance limit.

21. The software of claim 20, wherein the virtual gage is generated from the virtual part and the tolerance limit.

22. The software of claim 20, wherein the virtual gage is operable to define the tolerance limit of the virtual part.

23. The software of claim 20, further comprising a go-no go gage, the go-no go gage operable to define the tolerance limit of the virtual part.

24. A method for defining a part, the method comprising:
generating a virtual part operable to describe a part;
generating a virtual gage operable to define the virtual part, wherein the virtual part and the virtual gage are operable to define a shape and a size of a physical part.

25. The method of claim 24, further comprising generating the virtual part during a design process.

26. The method of claim 24, further comprising generating the virtual gage generally concurrently with the virtual part.

27. The method of claim 24, further comprising associating a tolerance limit with the virtual part.

28. The method of claim 27, further comprising generating the virtual gage from the virtual part and the tolerance limit.

29. The method of claim 27, further comprising defining the tolerance limit of the virtual part using the virtual gage.

30. The method of claim 27, further comprising providing a go-no go gage, the go-no go gage operable to define the tolerance limit of the virtual part.

31. A system for verifying a part, the system comprising:
means for generating a virtual part operable to describe a part;
means for generating a virtual gage operable to define the virtual part;
means for generating a digitized part from a physical part corresponding to the virtual part; and
means for comparing the digitized part with the virtual gage to evaluate the digitized part.

32. A method for verifying a part, the method comprising:
generating during a design process a virtual part operable to describe a part;
associating a tolerance limit with the virtual part;
generating a virtual gage operable to define the virtual part, the virtual gage generated from the virtual part and the tolerance limit, the tolerance limit of the virtual part defined using the virtual gage;
providing a go-no go gage, the go-no go gage operable to define the tolerance limit of the virtual part;
generating a digitized part from a physical part corresponding to the virtual part;
providing a datum plane system, the datum plane system operable to align the digitized part in the virtual gage; and
comparing the digitized part with the virtual gage to evaluate the digitized part with the virtual gage.

* * * * *